G. HILLEGASS.
Wagon-Tire Tightener.
No. 54,159. Patented Apr. 24, 1866.
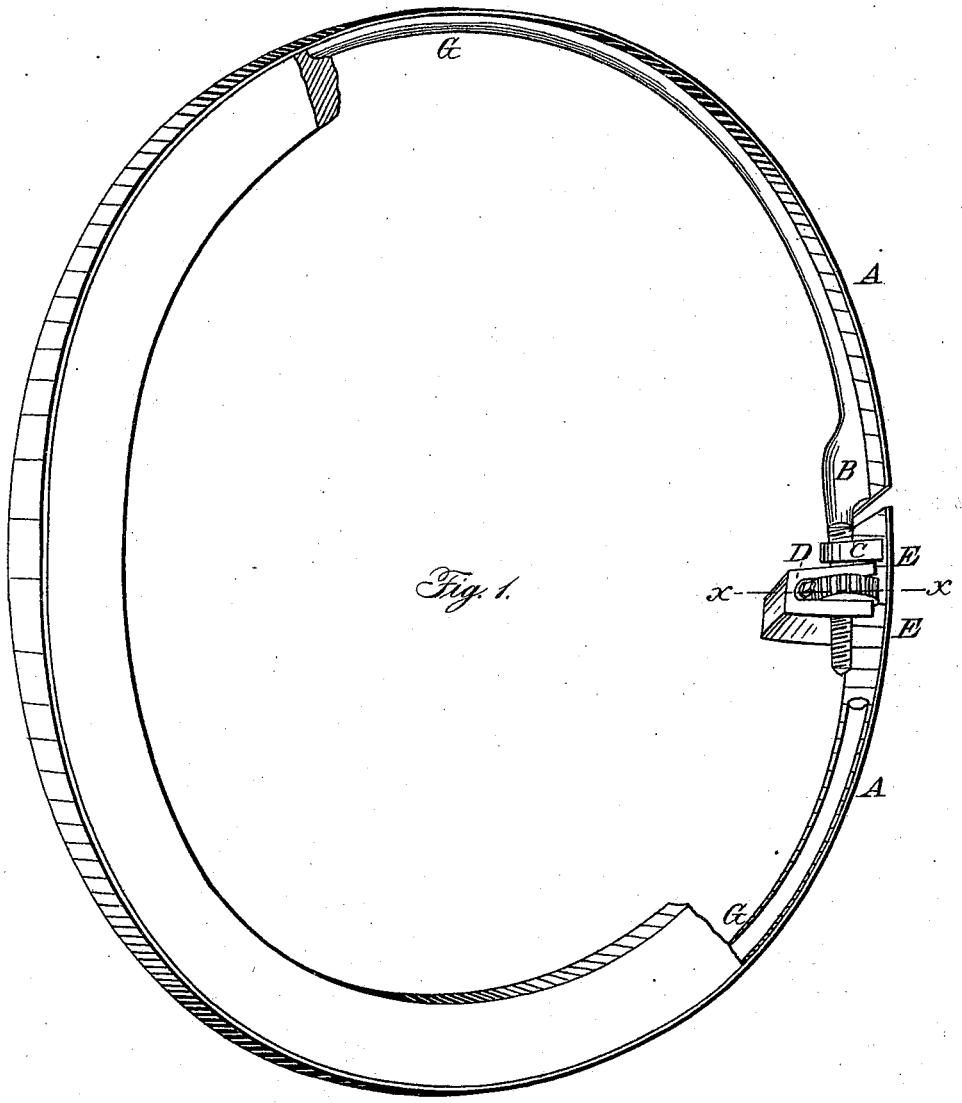
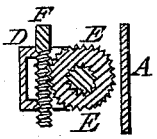
Witnesses:
L. Murphy
Chas. F. Clausen
Inventor:
George Hillegass
by D. P. Holloway & Co.
his attys
AM. PHOTO-LITHO. CO. N.Y. (OSBORNE'S PROCESS.)

UNITED STATES PATENT OFFICE.

GEORGE HILLEGASS, OF PHILADELPHIA, PENNSYLVANIA.

IMPROVEMENT IN DEVICES FOR TIGHTENING WAGON-TIRES.

Specification forming part of Letters Patent No. 54,159, dated April 24, 1866.

*To all whom it may concern:*

Be it known that I, GEORGE HILLEGASS, of Philadelphia, in the county of Philadelphia and State of Pennsylvania, have invented a new and useful Improvement in the Mode of Tightening Wagon-Tires or other Bands of Iron without Removing or Heating them; and I do hereby declare that the following is a full, clear, and exact description of the same, reference being had to the annexed drawings, made part of this specification, in which—

Figure 1 is a perspective view, and Fig. 2 is section on the line *x x*, Fig. 1.

In the different figures the same letters refer to identical parts.

A represents the tire of a wagon, having a rib, G, carried around the inside fitting into a corresponding recess in the felly of the wheel. The tire is not closed, and at one end is attached on the inner side the projecting tongue B, having a thread of a screw turned upon its projection, as shown. On other end of the piece composing the tire is attached the fixed collar C, through a hole in which the point of the tongue B passes, receiving on its extremity the nut E, which is made round and has teeth cut on its periphery of a proper spiral to receive the action of the endless screw F, which is sustained by the yoke D, passing around the nut and endless screw, and supported by the tongue B, which passes freely through holes in the extremities of this U-formed yoke. The whole of this mechanism is embodied in the felly and the end of the endless screw. I propose to cover with a plate, which being removed, this screw may be operated by means of a socket-wrench, drawing together or loosening the tire, as desired.

What I claim as my invention, and seek to secure by Letters Patent, is—

1. A device for contracting the tire of a wagon or other band by an endless screw, F, nut E, collar C, and tongue B, substantially in the manner set forth.

2. The rib G on the inside of the tire A, in combination with a device for contracting the tire, substantially as set forth.

In testimony whereof I have signed my name to this specification in the presence of two subscribing witnesses.

GEORGE HILLEGASS.

Witnesses:
JOHN S. HOLLINGSHEAD,
R. MASON.